Jan. 13, 1959
F. G. STOESSER
2,868,206
INTRA LUMINAL VEIN STRIPPER
Filed July 25, 1956
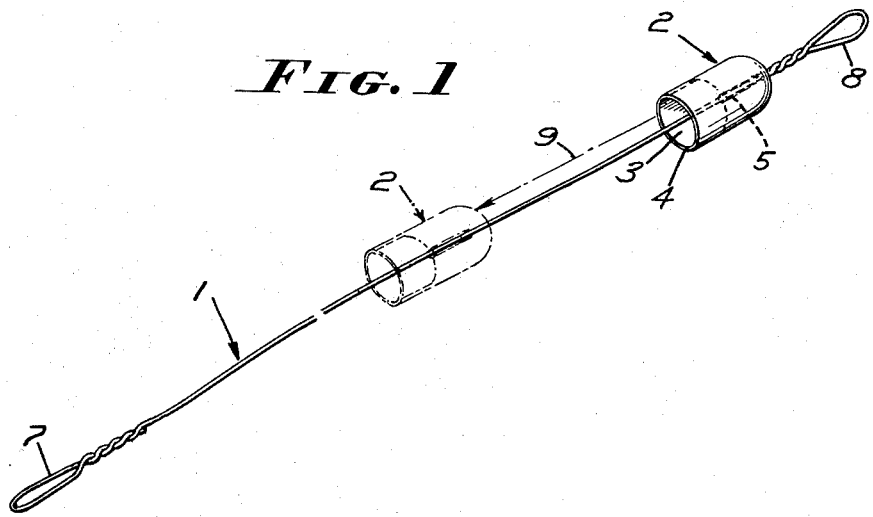
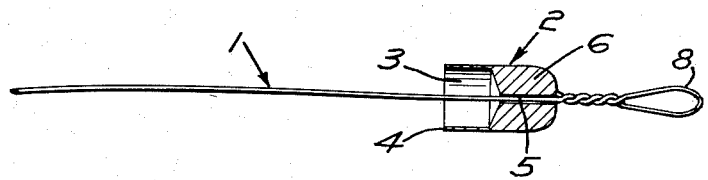
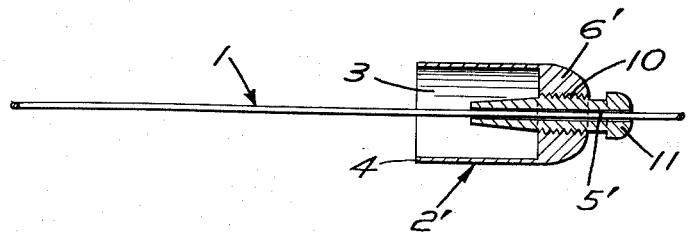
INVENTOR:
FREDERICK G. STOESSER
BY:
Beau, Brooks, Buckley & Beau,
ATTORNEYS.

United States Patent Office 2,868,206
Patented Jan. 13, 1959

2,868,206

INTRA LUMINAL VEIN STRIPPER

Frederick G. Stoesser, Buffalo, N. Y.

Application July 25, 1956, Serial No. 599,948

6 Claims. (Cl. 128—303)

This invention relates to a new and useful surgical instrument in the nature of an intra luminal vein stripping device.

My experience over the past twenty-four years as a surgeon with some 3,000 vein operations has led me to the conclusion that vein stripping is far superior to single or multiple vein ligations in the treatment or eradication of varicose veins, and therefore is much to be preferred.

However, vein strippers heretofore available have certain disadvantages in that, for example, the vein tends to turn inside out or split longitudinally, necessitating the use of a stripper having a large head or bulb to obviate this tendency and/or ligating the vein to the stripper to prevent such inversion. In addition, such prior art strippers have the further disadvantage that considerable time and effort is required to remove the stripped vein from the stripper.

Accordingly, it is a primary object of my invention to provide a vein stripper which will substantially preclude inversion of the vein.

In addition, it is an object of this invention to provide a vein stripping device which will shear off perforating veins and avoid tearing thereof.

Another object of this invention is to provide a stripper device as aforesaid having means for quickly and relatively effortlessly removing the stripped vein from the device subsequent to the operation.

Still another object of this invention is to provide an intra luminal vein stripper having the aforesaid characteristics and which is of simple construction, using parts which are relatively inexpensively fabricated and readily assembled.

An intra luminal vein stripper in accord with my invention is characterized in one aspect thereof by the provision of an elongated wire carrying a bucket-like head having a relatively thin walled cup portion facing the probing end of the wire.

In another aspect thereof, an intra luminal vein stripper constructed in accord with my invention is characterized by the provision of a bucket for engaging the end of the vein to be removed and stripping the same from the surrounding tissue, which bucket is slidable along the wire to the probing end thereof for quickly and easily removing the stripped vein from the wire.

The foregoing and other objects, advantages and characterizing features of an intra luminal vein stripper constructed in accord with my invention will become clearly apparent from the ensuing detailed description of a presently preferred embodiment and one modification thereof, taken together with the accompanying drawing illustrating such embodment and modification and comprising a part of this specification wherein:

Fig. 1 is a generally perspective view of a presently preferred form of intra luminal vein stripper constructed in accord with my invention, showing in full lines the position of the vein engaging bucket member during the operation and in broken lines the manner in which the bucket member is moved toward the probing end to remove the stripped vein from the wire;

Fig. 2 is a longitudinal sectional view through the bucket member of Fig. 1; and Fig. 3 is a longitudinal sectional view corresponding to Fig. 2 but showing a modified construction.

Referring now to the accompanying drawing, the vein stripper of my invention comprises an elongated, slender wire generally designated 1 and a bucket member, generally designated 2, slidable thereon.

In the embodiment of Figs. 1 and 2 the bucket member preferably is constructed from stainless steel shaft material and has a relatively thin walled cup portion 3 formed therein as by drilling out the center of the shaft material to approximately ½ of its length. I have found that, for most purposes at least, three different shaft sizes will suffice, to wit: ¼ inch in diameter and ⅝ inch line; ⅜ inch in diameter and ¾ inch long; and ½ inch in diameter and ⅞ inch in length. The cup portion 3 is formed by using, for example, a 3/16 inch drill for the smaller cup, a 5/16 inch drill for the medium-sized cup and a 7/16 inch drill for the largest size, leaving in each instance a thin cup wall or rim 4 of approximately 1/32 inch thickness.

A hole 5 is drilled or otherwise formed through the center of the solid remainder of the shaft, comprising the bucket main body part 6, and this hole accommodates the wire strand 1 in free sliding relation. The rear end of bucket 2 preferably is rounded off.

Wire 1 preferably comprises a single strand of tempered, stainless steel wire, and has a lesser diameter than hole 5. For example, hole 5 can be approximately 0.058 inch in diameter, in which case wire 1 preferably has a diameter of 0.037 inch, whereby bucket member 2 is freely slidable on wire 1 but with a fit sufficiently close that, with a body part 6 of substantial length as illustrated, undue wobbling or tilting of bucket 2 off the axis defined by wire 1 is precluded.

One end of wire 1, comprising that end toward which the cup portion 3 opens, is doubled over on itself and then tightly twisted to form a relatively narrow loop 7. The opposite end of wire 1 is similarly doubled over and twisted upon itself, but forms a relatively large loop 8, the loops 7 and 8 being for example ⅛ and ¼ inches wide, respectively. The wider loop 8 acts as an end stop for bucket member 2, to prevent it from sliding rearwardly off wire 1, and the forward loop 7 forms a probing end for the wire. I find that a wire fourteen inches long is satisfactory for use with the smallest bucket, and that a wire thirty-four inches long is suitable for use with the two larger buckets.

My intra luminal vein stripper is used in the following manner. An oblique incision is made over the fossa ovalis, and the saphenus vein and its branches are isolated, transected and ligated close to the femoral junction, care being take to avoid drawing a portion of the anterior wall of the femoral vein up into the ligature. A clamp is left on the distal severed end of the long saphenus vein, and this area is temporarily covered with a sponge. A transverse incision, about 1 inch long, then is made just anterior to the medial malleolus, and the long saphenus vein is transected at this point and the distal end tied.

Then, the edges of the proximal end of the vein are grasped with two mosquito hemostat forceps, and the probing end 7 of wire 1 of either the medium or the large sized stripper is passed into the lumen of the vein, the large sized stripper being used only on unusually large veins. The probing end 7 of the stripper facilitates passage of the stripper into and through the vein, whereby frequently it can be passed all the way from the malleolus to the groin. Also, wire 1 preferably is resilient and formed so that normally it has a slight curvature, whereby passage of the probing end 7 through the vein is facilitated by rotating wire 1 to change the direction of its curve and thereby by-pass pockets or sacculations in the lumen of the vein.

Then, the clamp is removed from the proximal end of the saphenus vein, and when the stripper wire 1 projects from the open end of the vein it is grasped with a Kocher clamp and drawn cephalad. This causes the proximal end of the saphenus vein at the ankle to fall into the cup 3 of bucket 2 and, as the stripper is drawn along the vein, to pucker on wire 1.

The cup portion 3 effectively prevents inversion of the vein, because it receives and retains a substantial portion of the proximal end of the vein, whereby the remainder of the vein simply puckers on wire 1 as it is stripped. In addition, the thin wall 4 of cup 3 tends to shear off perforating veins, rather than tearing them, whereby the saphenus vein is neatly stripped from such perforating veins and from adjacent tissue, rather than being torn therefrom.

If the stripper fails to pass the entire length of the long saphenus vein, which usually is caused by a previous phlebitis, one or two additional incisions are made at the mid-thigh, knee or mid-calf level. Additional varicosed branches also are removed through such incisions. Also, the short saphenus vein is always removed, to prevent the likelihood of recurrences, and two incisions are made for this purpose, one over the popliteal area and the other just posterior to the lateral malleolus. The small stripper with its short wire is used for this purpose, and in this instance the vein usually is extracted toward the foot.

When the stripper has been drawn completely along the vein and removed from the body member, the stripped vein is puckered or gathered on wire 1 against bucket 2 and in cup 3. It is a particular feature of my invention that the stripped vein is quickly and easily removed from the stripper by simply sliding bucket 2 toward the probing end 7, as indicated by the arrow 9 and the broken line showing of bucket 2 in Fig. 1. This readily and effectively strips the diseased vein from wire 1, and causes it to drop off into the specimen dish.

Thus, it is seen that an intra luminal vein stripper constructed in accord with my invention fully accomplishes the foregoing objects and effectively and efficiently removes the diseased vein. The relatively deep cup 3 of my stripper prevents the vein from inverting on itself and breaking, and the thin wall thereof tends to shear off connecting tissue and perforating veins rather than tearing the vein therefrom. The probing end 7 and the curvature of wire 1 facilitate passage of the wire through the lumen of the vein, and the stripped vein is easily and quickly removed from the stripper by sliding bucket 2 along wire 1. At the same time, part 6 prevents tilting of bucket 2 relative to wire 1, such as might cut the vein during the operation. The use of the stripper of my invention also materially shortens the operating time.

In the modified stripper bucket 2' illustrated in Fig. 3 the general organization, action and results provided remain the same. However, the solid part 6' of bucket member 2' has a relatively large opening 10 receiving an elongated plug 11 having an opening 5', corresponding to opening 5 of bucket 2, for passage of wire 1. As in the case of the solid part 6 of bucket 2, the elongated plug 11 supports bucket 2' on wire 1 for free sliding movement while avoiding undue tilting of the bucket such as might cut the vein, and it will be observed that if desired the plug 11 can be threaded into opening 10 of bucket part 6', enabling the use of buckets of different sizes but all having the opening 10 on the same plug 11. In other words, plug 11 can be used to support bucket members 2' of different diameters and lengths.

While only the presently preferred embodiment of my invention and one modification thereof have been disclosed and described in detail herein, it will be appreciated that my invention is not necessarily limited to the details thereof which can be varied and further modified without departing from the spirit of the invention and the scope of the appended claims.

Having fully disclosed and completely described my invention, and its mode of operation, what I claim as new is:

1. An intra luminal vein stripper comprising, an elongated wire adapted to be inserted into the vein to be stripped, and a bucket member carried by said wire for engaging such vein and stripping the same as said wire is drawn therethrough, said member having a generally cupped portion alined generally lengthwise of said wire for receiving such vein and being movable along said wire from one end to the other thereof for removing the stripped vein therefrom.

2. An intra luminal vein stripper comprising, an elongated wire having a probing end adapted to be inserted into the vein to be stripped, a bucket member carried by said wire, said member having a cupped portion opening toward said probing end for engaging such vein and stripping the same as said wire is drawn therethrough, said member being slidable along said wire to said probing end to remove the stripped vein therefrom, and stop means at the other end of said wire.

3. An intra luminal vein stripper comprising, an elongated wire having a probing end and stop means at the opposite end thereof, and a bucket member freely slidable on said wire from said stop means to said probing end, said bucket member having a cupped portion opening toward said probing means for receiving and stripping such vein and a body portion of substantial depth closely surrounding said wire to steady said bucket member thereon.

4. An intra luminal vein stripper comprising, a normally curved wire of resilient material, one end of said wire being looped upon itself to form a probing end for insertion into the vein to be stripped, a bucket member carried by said wire, said bucket member having a relatively thin walled cupped portion opening toward said probing end for receiving and stripping said vein and a body of substantial depth closely surrounding said wire to avoid undue tilting of said bucket member relative to said wire, said bucket member being slidable on said wire to remove the stripped vein therefrom, and the other end of said wire being twisted upon itself to form a stop for said bucket member.

5. An intra luminal vein stripper as set forth in claim 4, wherein said bucket member is of one-piece construction.

6. An intra luminal vein stripper as set forth in claim 4, wherein said bucket member body includes a detachable plug closely surrounding said wire.

References Cited in the file of this patent

UNITED STATES PATENTS

| | | |
|---|---|---|
| 1,218,835 | Bower | Mar. 13, 1917 |
| 2,661,003 | Devine et al. | Dec. 1, 1953 |
| 2,779,334 | Sandborn | Jan. 29, 1957 |

OTHER REFERENCES

New Vein Stripper and Technique of Stripping, by Kutz and Hendricks, from pages 271–275 of Surgery, (Copy in Div. 55.), Feb. 1951, 128–303.

A New Intraluminal Vein Stripper, by Zollinger and Gilmore from Surgery, Nov. 1952, (Copy in Div. 55.), pages 846–850. 128–303.

UNITED STATES PATENT OFFICE
CERTIFICATE OF CORRECTION

Patent No. 2,868,206

January 13, 1959

Frederick G. Stoesser

It is hereby certified that error appears in the printed specification of the above numbered patent requiring correction and that the said Letters Patent should read as corrected below.

Column 1, line 65, for "embodment" read -- embodiment --; column 2, line 18, for "line" read -- long --; column 4, line 45, for "said" read -- such --.

Signed and sealed this 5th day of May 1959.

(SEAL)
Attest:

KARL H. AXLINE
Attesting Officer

ROBERT C. WATSON
Commissioner of Patents